(12) United States Patent
Álvarez Ballesteros et al.

(10) Patent No.: US 12,714,037 B2
(45) Date of Patent: Aug. 25, 2026

(54) PLASTIC LAMINATE TO COVER AGRICULTURAL CROPS

(71) Applicant: REYENVAS, S.A., Alcalá de Guadaíra (ES)

(72) Inventors: Juan Andrés Álvarez Ballesteros, Torrelavega (ES); Víctor Martínez Pernía, Alcalá de Guadaíra (ES); Antonio Jesús Redondo Murcia, Alcalá de Guadaíra (ES)

(73) Assignee: REYENVAS, S.A., Alcalá de Guadaíra (ES)

( * ) Notice: Subject to any disclaimer, the term of this patent is extended or adjusted under 35 U.S.C. 154(b) by 0 days.

(21) Appl. No.: 18/899,746

(22) Filed: Sep. 27, 2024

(65) Prior Publication Data

US 2025/0107495 A1 Apr. 3, 2025

(30) Foreign Application Priority Data

Sep. 29, 2023 (EP) .................................... 23383004

(51) Int. Cl.
*A01G 13/21* (2025.01)
*A01G 9/14* (2006.01)
*A01G 13/24* (2025.01)

(52) U.S. Cl.
CPC ........... *A01G 13/21* (2025.01); *A01G 9/1438* (2013.01); *A01G 13/24* (2025.01); *A01G 2009/1446* (2013.01)

(58) Field of Classification Search
CPC .......... A01G 2009/1446; A01G 9/1438; A01G 13/24; A01G 13/21
See application file for complete search history.

(56) References Cited

U.S. PATENT DOCUMENTS 5,669,177 A * 9/1997 Frounfelker ........... A01G 13/26 47/29.5
12,317,782 B2 * 6/2025 Daios ..................... A01G 13/21
2015/0201565 A1 * 7/2015 Toye ...................... A01G 13/21 47/29.1
2023/0148407 A1 * 5/2023 Daios ..................... A01G 13/21 47/31.1
2023/0371448 A1 * 11/2023 Daios ..................... A01G 13/21

FOREIGN PATENT DOCUMENTS

AU 2022204933 A1 5/2023
EP 3017688 A1 5/2016
EP 3172961 A1 5/2017
GB 2243525 A 11/1991

OTHER PUBLICATIONS

European Search Report, EP23383004, Feb. 27, 2024, 2 pages.

* cited by examiner

*Primary Examiner* — Jessica B Wong
(74) *Attorney, Agent, or Firm* — Edell, Shapiro & Finnan, LLC

(57) ABSTRACT

The present disclosure relates to a plastic laminate for covering agricultural crops. The plastic laminate includes an upper film having a plurality of upper film holes, and a bottom film having a plurality of bottom film holes. In use, the plastic laminate is arranged over a tunnel frame to form a greenhouse. The bottom film holes are arranged higher than neighbouring upper film holes. The present disclosure also relates to greenhouses that are made from such plastic laminates and also methods for manufacturing plastic laminates for covering agricultural crops.

16 Claims, 5 Drawing Sheets

PLASTIC LAMINATE TO COVER AGRICULTURAL CROPS

CROSS-REFERENCE TO RELATED APPLICATIONS

The present application relates to and claims the benefit and priority to European Patent Application No. EP23383004.1 filed Sep. 29, 2023, which is herewith incorporated by reference in its entirety.

FIELD

The present disclosure relates to plastic laminates, and more in particular to plastic laminates for covering agricultural crops.

BACKGROUND

Greenhouses are structures which provide specific environments for growing agricultural crops. Greenhouses are generally used to modify vegetable cultivation time and to cultivate out-of-season plants.

Greenhouses regulate temperature and humidity to obtain specific environmental conditions for the agricultural crops that are being cultivated at the inside of the greenhouse. Generally, greenhouses aim to capture the light and heat of the sun with large areas of transparent materials. The three most common transparent materials used in the roof and walls of modern greenhouses are glass panes, rigid plastics made of polycarbonate and plastic films made of polyethylene.

Greenhouses having a glass roof and glass walls are particularly expensive. In addition, their thermal insulation can be quite poor and during the cold seasons, and thus the temperature regulation provided by the greenhouse may not be enough. A significant amount of additional energy may have to be used in order to reach a desired temperature. This type of greenhouse comprises ventilation windows to regulate the internal temperature and moisture of the greenhouse.

Greenhouses made out of plastic are faster and easier to build and tend to be cheaper than glass greenhouses. Greenhouses made out of plastic films have become the most popular out of the plastic-based greenhouses. These greenhouses comprise a plastic film arranged on a structural frame.

Examples of plastic-based greenhouses include polytunnels. A polytunnel (also known as a polyhouse, hoop greenhouse or hoophouse, grow tunnel or high tunnel) is a tunnel having a frame, which may be made of e.g. steel, and covered in polyethylene. The tunnel may have a semi-circular or other cross-section. Generally, the cross-section may be convex. Rain and other precipitation can thus slide off the sides of the tunnel.

Depending on the requirements of the crops being cultivated in the greenhouse e.g. of ventilation, humidity and/or characteristics of the pesticides applied, a certain type of plastic film may be used. The location of the greenhouse e.g. on areas highly exposed to UV radiation, rainy conditions and/or cold temperatures also has to be taken into account when choosing the optimal plastic film. This is why plastic films of multiple films adhered to each other e.g. polyethylene, polyethylene-vinyl acetate are widely used. The films may be made from different materials, such that the plastic film comprises a combination of different characteristics.

One of the key aspects of a correct functioning of a greenhouse is ventilation of the space comprising the crops. In order to provide ventilation of the air within the plastic film greenhouses, perforated plastic films are used. Perforated plastic films allow air renewal and a reduction of temperature. However, the use of perforated plastic films in greenhouses is posing a challenge since undesired external elements e.g. rainwater may access the greenhouse through the holes in the film, altering the environment within the greenhouse space.

EP 3 017 688 A1 aims to solve this problem. It refers to a plastic film for covering agricultural crops, the purpose of which is to facilitate ventilation of the covered area and, through ventilation, to assist in the reduction of the internal temperature when it exceeds the limits, and also to facilitate the release of moisture from the covered area without allowing for the inflow of rainwater, and to allow for the renewal of the air in the covered area. It consists of two plastic films, the top and bottom film, which are joined by repeated adhesions along their length, and have recurring ventilation holes positioned in such a way that none of the holes in the top plastic film coincide fully or partially with any of the holes in the bottom plastic film: Each hole or transverse row of holes in the one film is positioned between two holes or transverse rows of holes in the other film.

Even though the prior art film can provide ventilation, the plastic film disclosed in EP 3 017 688 does not effectively prevent precipitation, specifically rainwater, from entering the greenhouse.

The present disclosure intends to provide a plastic laminate which at least solves some of the above-mentioned drawbacks.

SUMMARY

In a first aspect, a plastic laminate configured for being arranged over a tunnel frame to cover agricultural crops is provided. The plastic laminate comprises an upper film having a plurality of upper film holes, and a bottom film having a plurality of bottom film holes, wherein the upper film is attached to the bottom film. The top and bottom film holes are arranged such that when the plastic laminate is arranged over the tunnel frame the bottom film holes are arranged higher than neighbouring upper film holes.

In accordance with this aspect, the perforated plastic laminate may allow ventilation of the covered agricultural crops while, at the same time, preventing external elements e.g. rainwater or condensed water from crossing the laminate and reaching the covered inner space.

Air within the agricultural crops may flow from the space covered by the plastic laminate through the plurality of bottom film holes in the bottom film and through the plurality of upper film holes in the upper film, reaching the outside of the plastic laminate. In addition, the configuration of the plastic laminate may cause rainwater which may fall on the plastic laminate to effectively slide towards the ground without entering the covered space. Even when rainwater reaches the plurality of upper film holes, water will not reach the inside via the plurality of bottom film holes, because the neighbouring bottom film holes are arranged higher than the upper film holes.

Throughout the present disclosure, a hole may be understood as a hole extending through the thickness of one of the films. A hole in a film extends across the cross-section of the film from a first side of the film to an opposite second side of the film.

Throughout the present disclosure, holes that are "neighbouring" to a specific hole may be regarded as the two holes that are arranged closest to the specific hole. I.e. in accordance with this first aspect, upper film holes arranged closest to a bottom film hole are arranged lower than the corresponding bottom film hole.

In a further aspect, a plastic laminate configured for being arranged over a tunnel frame to cover agricultural crops is provided. The plastic laminate comprises an upper film having a plurality of upper film holes, and a bottom film having a plurality of bottom film holes, wherein the upper film is attached to the bottom film. The plastic laminate comprises a central longitudinal axis. The plastic laminate may be configured such that the central longitudinal axis is configured to be arranged along a longitudinal top area of a tunnel frame. Upper film holes are arranged further away from the central longitudinal axis than the bottom film holes.

In accordance with this aspect, when the plastic laminate is arranged over the tunnel frame, the upper film holes are arranged lower than neighbouring bottom film holes.

In yet a further aspect, a greenhouse is provided. The greenhouse comprises a tunnel frame and a plastic laminate according to examples of the aforementioned aspects is provided.

In yet a further aspect, the present disclosure provides a method for manufacturing a plastic laminate for being arranged over a tunnel frame to cover agricultural crops. The method comprises providing an upper plastic film comprising a plurality of upper film holes and providing a bottom plastic film comprising a plurality of bottom film holes. The method further comprises joining the upper and bottom plastic films to form the plastic laminate, wherein the plastic laminate has a central longitudinal axis, and wherein the upper and bottom plastic films are joined such that the bottom film holes are closer to the central longitudinal axis than neighbouring upper film holes.

In some examples, joining of the upper and bottom plastic films may comprise joining by adhesives. In other examples, the plastic films may be joined e.g. through heating or welding.

The individual films may be made using a variety of manufacturing processes, such as (co-)extrusion and film blowing. The individual films may comprises a single layer, or may comprises multiple layers. The materials for the individual films may be the same or may be different from each other to adapt the individual films to their specific function or to the specific environmental conditions in which they may be used.

Holes through the individual films may be made e.g. in a perforation process after extrusion or film blowing.

In some examples, the plastic laminate may comprise a plurality of joints arranged in a longitudinal direction of the laminate joining the upper film to the bottom film. In some examples, the longitudinal area along which the joints may be arranged may be further from the longitudinal central axis than the upper film holes and the lower film holes of the laminate. The upper film and the bottom film may only be joined together by the plurality of joints and the plastic laminate may comprise an intermediate space within the two films which may allow gas currents and/or rainwater to flow through it. Separation of the joints allows for water or other liquid that is trapped between the upper film and the bottom film to escape and fall or slide down along the outside of the bottom film.

In some examples, the upper film comprises upper film holes on both sides of the central longitudinal axis, and the bottom film comprises bottom film holes on both sides of the central longitudinal axis. Optionally, the distribution of the holes may be symmetric with respect to the central longitudinal axis.

In some examples, the upper film holes are arranged along at least a first longitudinal row, and the bottom film holes are arranged along a second longitudinal row, and when the plastic laminate is arranged over the tunnel frame, the second longitudinal row is arranged higher than the first longitudinal row.

BRIEF DESCRIPTION OF THE DRAWINGS

Non-limiting examples of the present disclosure will be described in the following, with reference to the appended figures, in which.

The figures refer to example implementations and may only be used as an aid for understanding the claimed subject matter, not for limiting it in any sense.

DETAILED DESCRIPTION OF EXAMPLES

In these figures, the same reference signs have been used to designate matching elements.

Figure 1:
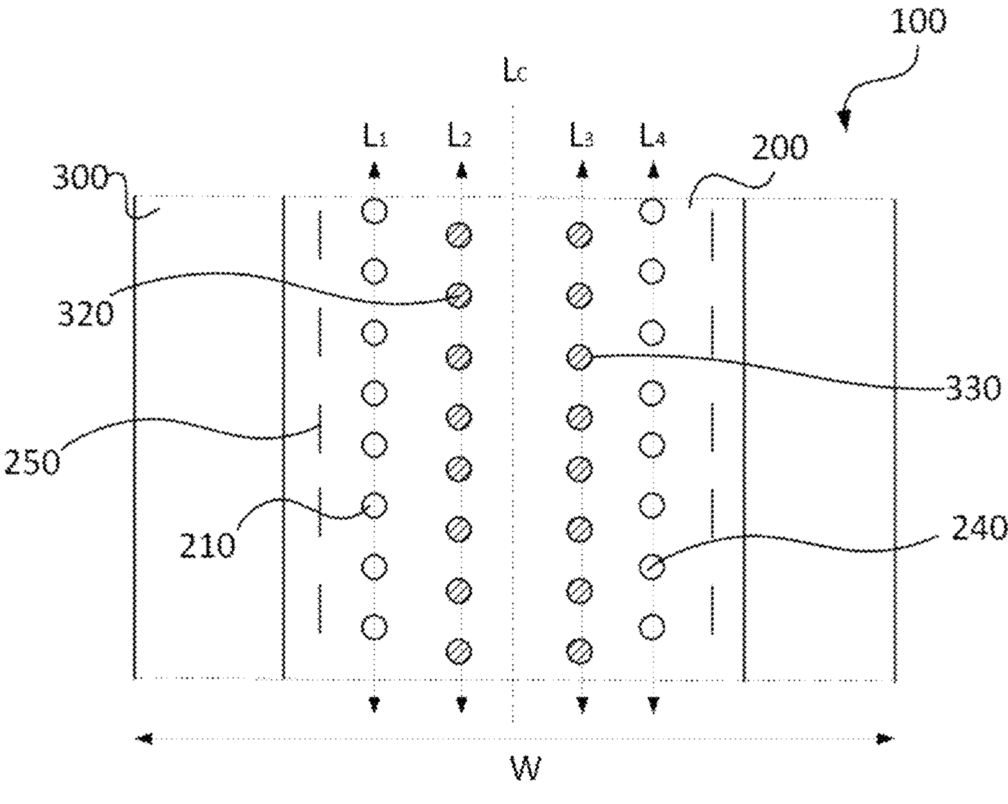
FIG. 1 schematically illustrates a top view of a region of a plastic laminate according to an example of the present disclosure.
Figure 2:
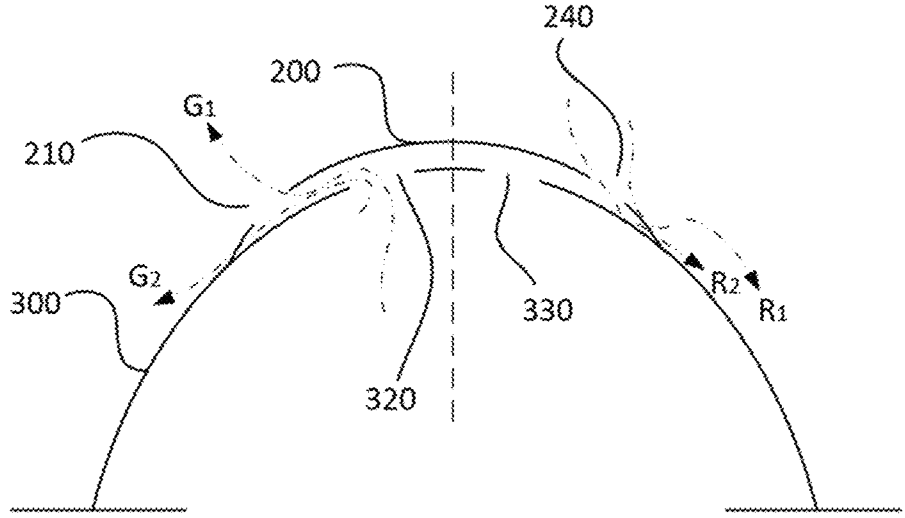
FIG. 2 schematically illustrates a cross-section of the plastic laminate of FIG. 1 covering a tunnel frame to form a greenhouse according to an example of the present disclosure.

FIG. 1 schematically illustrates a top view of a region of a plastic laminate 100 for being arranged on a tunnel frame to cover agricultural crops according to an example of the present disclosure. FIG. 2 illustrates a cross-sectional view of the same plastic laminate 100 arranged over the tunnel frame.

A tunnel frame may comprise a plurality of frame sections, separated from each other along a longitudinal direction. The frame sections may generally have a convex structure, e.g. the frame may have a plurality of bows or arches. The frames may be made from steel or other structural material.

The cross-section of the tunnel frame is generally constant for most of the length of the tunnel frame. When the plastic laminate is arranged over the tunnel frame, a longitudinal section is arranged along the highest or top parts of the tunnel frame. In most cases, the highest point or part of the tunnel frame is in the middle. In such a case, a central longitudinal axis of the plastic laminate may be arranged along the highest part of the tunnel frame. The portions of the plastic laminate that are further away from the central longitudinal axis will in practice be lower than the portions of the plastic laminate that are closest to the central longitudinal axis.

The plastic laminate 100 has a length and a width W. The plastic laminate may be used to form the roof and side walls of a greenhouse and may form an inversed U-shape such that the central longitudinal axis $L_c$ of the plastic laminate is the highest part of the laminate i.e. the area furthest from the ground.

The plastic laminate 100 comprises an upper film 200 comprising a plurality of upper film holes 210 arranged along a first longitudinal row $L_1$ of the laminate, and a bottom film 300 comprising a plurality of bottom film holes 320 arranged along a second longitudinal row $L_2$ of the laminate. The bottom film 300 of the plastic laminate is continuous along the first longitudinal row $L_1$ of the laminate.

A continuous area of the plastic laminate may be regarded as a solid area of the plastic laminate which does not comprise holes or gaps. A continuous area may therefore be an area of the plastic laminate which does not comprise holes, and which is impermeable, preventing the passage of gases or fluids through it.

The bottom film holes 320 are arranged such that, when in use, the bottom film holes 320 are arranged higher than the neighbouring upper film holes.

The plastic laminate may be part of a greenhouse structure and may allow gas exchange between an inside of the greenhouse and an outside of the greenhouse. At the same time, the plastic laminate may prevent rainwater from passing through the holes of the bottom film and therefore may prevent rainwater from reaching the inside of the greenhouse. The bottom film holes do allow for gas exchange. Air from inside the greenhouse may pass through the bottom film holes and subsequently through the upper film holes. Raindrops, hail and snow may pass through the upper film holes, but since neighbouring bottom film holes are arranged higher, the precipitation will not pass to the inside of the greenhouse. Temperature and humidity may be successfully reduced in hot and humid environments. The overall environment of the inner space of the greenhouse may be enhanced.

The plastic laminate may comprise a plurality of joints 250 arranged in a longitudinal direction of the laminate joining longitudinal areas of the upper film 200 and the bottom film 300 together. The longitudinal area along which the joints 250 may be arranged may be further from the longitudinal central axis $L_c$ than the first $L_1$ and second $L_2$ longitudinal rows of the laminate.

The plastic laminate 100 may comprise a first plurality of joints 250 at a first side of the central longitudinal axis, and a second plurality of joints 250 at a second side of the central longitudinal axis. The plurality of holes of the upper film and of the bottom film may be arranged within the area defined between the first and second plurality of joints 250.

The joints may be separated from each other along the longitudinal direction, i.e. they may be intermittent, leaving areas in between them where the upper film and bottom film are not joined to each other. The intermediate space within the two films can allow gas currents and/or rainwater to flow through it as will be further explained in the examples disclosed in FIGS. 2 and 3.

In some examples, the joints 250 may have a length of about 30-50 cm, specifically 20-40 cm. A pitch of the joints 250 may be of a similar order of magnitude, e.g. 30-50 cm.

In some examples, the upper film 200 and the bottom film 300 may be joined together with adhesives. In other examples, the films may be attached to each other through welding. Such welding may be interrupted in a similar manner as illustrated before.

In this example, the holes of the top 200 and bottom 300 films have a substantially circular shape. The holes may have a diameter of 10 cm or less. The size of the holes may allow ventilation of the inner space within the plastic laminate i.e. exchange of gases, and may effectively keep away external components which may pollute or change the environment conditions of the inner space of the greenhouse. In further examples, both size and shape of the holes may be different. In further examples, size and shape of the holes may be varied in the laminate.

The plurality of upper film holes 210 may be separated along the width direction (i.e. transverse direction, perpendicular to the longitudinal direction) from the plurality of bottom film holes 320. A distance may be selected such that in use, water from the outside of the film will not reach the bottom film holes. A distance along the transverse direction between the rows of holes may be e.g. 10 cm, 15 cm, 20 cm or more.

The distance between the plurality of holes arranged in a same row may be substantially the same. In other examples, there may be different distances between holes arranged along a same longitudinal area.

The plurality of bottom film holes 320 is closer to a central longitudinal axis $L_c$ of the plastic laminate 100 than the plurality of upper film holes 210.

Further, the plastic laminate 100 may comprise more than two longitudinal areas with a plurality of holes. As an example, FIG. 1 shows a region of the plastic laminate comprising four different rows of holes.

As shown, the bottom film 300 may further comprise bottom film holes 330 arranged along a third longitudinal row $L_3$ of the plastic laminate, and the upper film 200 may further comprise a plurality of holes 240 arranged along a fourth longitudinal row $L_4$ of the plastic laminate.

The bottom film and bottom film holes, and the upper film and the upper film holes may be substantially symmetric with respect to the central longitudinal axis $L_c$. In the example of FIG. 1, the first and second longitudinal rows $L_1$, $L_2$ are located on a first side of the central longitudinal axis $L_c$ and the third and fourth longitudinal areas $L_3$, La are located on a second side opposite to the first side of the central longitudinal axis $L_c$.

In the illustrated example, the pitch and size of the upper film holes and bottom film holes are the same. In other examples, the pitch and size of the upper film holes maybe different from the pitch and size of the bottom film holes. In some examples, the pitch may be about 10-50 cm, more specifically about 20-40 cm. A diameter of the upper film holes and bottom film holes may be e.g. 5-10 cm.

In some examples, as shown in the example of FIG. 1, the plurality of holes 330 of the bottom film may be longitudinally offset with respect to the holes of the upper film. In other examples, the holes in the upper and bottom films may be arranged next to each other.

In some examples, the width of the upper film 200 may be different from the width W of the bottom film 300. Specifically, in the illustrated examples, the upper film 200 has a shorter width than the lower film. The plurality of holes may only be located in a certain area of the plastic laminate and the upper film may only cover the bottom film in the region of the plastic laminate destined to allow ventilation of the greenhouse.

In such examples, the bottom film 300 may be wide enough to reach the ground and seal the greenhouse space, while the upper film 200 may have a width which covers at least the area wherein the holes in the bottom film are arranged, generally in a central longitudinal area of the plastic laminate. In some examples, the width of the upper film 200 may cover at least 20-30% of the width of the bottom film 300. The plastic laminate may comprise less plastic material and a reduction of costs may be achieved. In other examples, the width W of the upper film 200 may be substantially the same as the width W of the bottom film 300.

In some examples, the thickness of the top and bottom films 300, 200 may be different e.g. the bottom film may be thicker than upper film. In other examples, the thickness may be substantially the same.

The plastic material of the upper film and the bottom film may be chosen according to the required specifications of the plastic film e.g. in terms of durability, permeability and/or environmental temperature in the location of the greenhouse.

The upper film and/or the bottom film may be made of or may comprise polyolefins. In some examples, the composition of the films may include one or more of the following materials: polyethylene (PE), PE copolymers, polypropylene (PP), PP copolymers, ethylene vinyl acetate (EVA), ethylene butyl acrylate (EBA), polyolefin plastomers (POP), olefinic elastomers e.g. ethylene propylene diene monomer (EPDM), styrene-butadiene copolymers (SBS), polyamide (PA), ethylene vinyl alcohol (EVOH), polyvinyl alcohol (PVOH), polyethylene terephthalate (PET) and adhesive polymers for ensuring adhesion between films.

One or more of the films may comprise several layers.

In some examples, the upper film 200 may be made of a first plastic material and the bottom film may be made of a second plastic material, i.e. the composition of the upper film 200 may be different from the composition of the bottom film. In other examples, the composition of the top and bottom films of the plastic laminate may be the same.

FIG. 2 shows a cross-section perpendicular to the longitudinal direction of the plastic laminate region of FIG. 1. In this example, the plastic laminate 100 is arranged covering a greenhouse (not shown) and defining substantially an inversed U-shape. The bottom film 300 of the plastic laminate completely covers the roof and the sidewalls of the greenhouse, reaching the ground and defining an inner space. On the other hand, the upper film 200 only covers a central longitudinal area of the plastic laminate.

The figure represents two different scenarios. The first scenario is represented on the left side of the figure, and schematically shows an example of relatively air flowing through the plastic laminate and leaving the inner space of the greenhouse. The second scenario is represented on the right side of the figure and schematically shows an example of the plastic laminate under rainy conditions.

The bottom and upper films 300, 200 are not permeable to gases, and as shown in FIG. 2, inner gasses such as air $G_1$, $G_2$ escape from the plastic laminate 100 through the holes arranged in it, in particular, through the holes 320 arranged along the bottom film 300 of the laminate.

After passing through the holes 320 arranged in the bottom film 300, a first current of gases $G_1$ may travel through the intermediate space within the top and bottom films 200, 300 and may exit the greenhouse through the holes 210 in the upper film 200. In a further example, after passing the holes 320 arranged in the bottom film 300 a second current of gases $G_2$ may travel through the intermediate space within the top and bottom films 200, 300 and may exit the greenhouse through the space between the intermittent joints 250.

Figure 3:
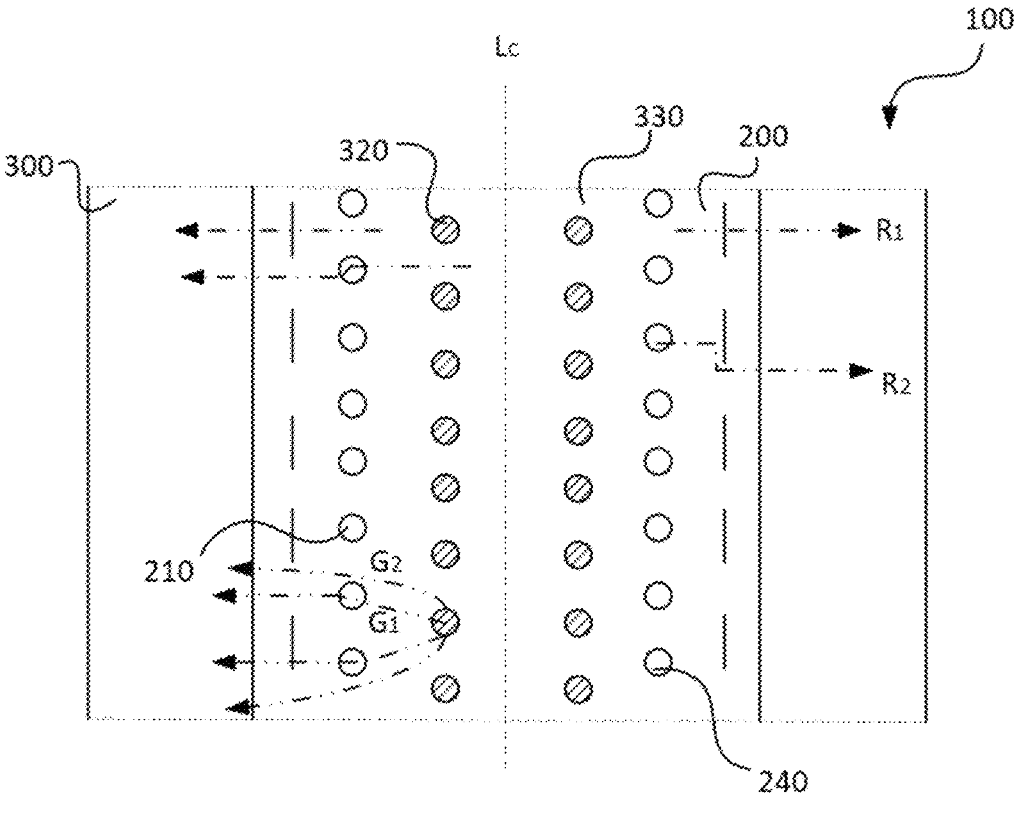
FIG. 3 schematically illustrates a top view of the same plastic laminate illustrating a flow of air and a flow of rain.

FIG. 3 schematically shows a top view of the plastic laminate of FIG. 2 illustrating similar flows of gas and rainwater. The lower part of FIG. 3 represents currents of gas flowing through the plastic laminate and leaving the greenhouse space. As previously discussed in the first example, the first current of gases $G_1$ reaches a hole 210 of the upper film 200 after passing the bottom film 300 through a hole 320 in the bottom film. This is represented in FIG. 3 by an abrupt change of angle of the current of gases $G_1$.

In the second example, the second current of gases $G_2$ exits the inner space of the greenhouse through the hole 320 of the bottom film and finds a path towards the outside of the plastic laminate through one of the gaps present between the joints 250 joining the upper film 200 and the bottom film 300.

The second scenario represented on the right side of FIG. 2 schematically shows an example of the plastic laminate during rainy conditions. In particular, FIG. 2 shows raindrops $R_1$, $R_2$ and the path that they follow after falling on the plastic laminate. These examples are also shown in FIG. 3.

In a first example, a first raindrop $R_1$ falls on the upper film 200 of the plastic laminate without encountering any hole along its path. The first raindrop $R_1$ slides over the upper film 200 towards the ground.

In a second example, a second raindrop $R_2$ falls on the upper film 200 of the plastic laminate sliding on its surface and encountering a hole 240 along its path towards the ground. In this second example, the second raindrop $R_2$ may pass through the hole 240 of the upper film and may fall on the bottom film 300 of the laminate. The second raindrop $R_2$ on the surface of the bottom film slides towards the ground.

On its path, the raindrop may encounter a joint 250 joining the top and the bottom film. The joint 250 may block the path of the raindrop, which may be stuck on the joint 250. The accumulation of several raindrops may finally cause them to separate from the joint and finally fall towards the ground through a different longitudinal area. Rainwater may not reach the holes in the bottom film after accumulation of several raindrops on these joints, as the bottom film is continuous along the longitudinal area where the holes in the upper film are arranged and the nearest holes in the bottom film are arranged higher. Accordingly, rainwater may be kept away from the inner space of the greenhouse.

Figure 4:
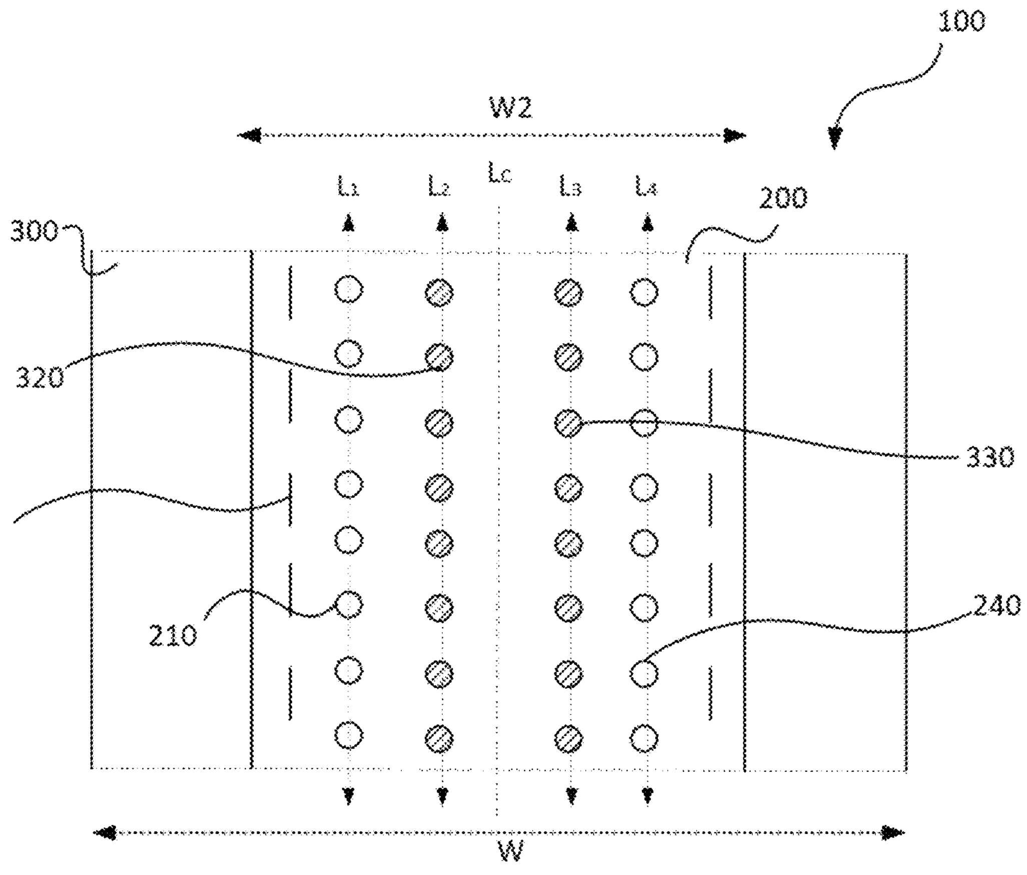
FIG. 4 schematically illustrates a further example of a plastic laminate.

FIG. 4 schematically illustrates a top view of another example of a plastic laminate 100. The example of FIG. 4 is generally similar to the example illustrated in FIGS. 1-3, and its functioning may be very similar. In the example of FIG. 4, the holes in the bottom film and in the upper film are arranged substantially in parallel.

In further examples of the present disclosure, the upper film holes of the plastic laminate may be arranged along three or more longitudinal rows, and the bottom film holes of the plastic laminate may be arranged along three or more longitudinal rows. In these examples, one or more longitudinal rows of upper and bottom film holes may be arranged on a first side of the central longitudinal axis ($L_c$) and one or more longitudinal rows of upper and bottom film holes may be arranged on a second side of the central longitudinal axis ($L_c$). An example of such plastic laminate is shown in FIG. 5.

Figure 5:
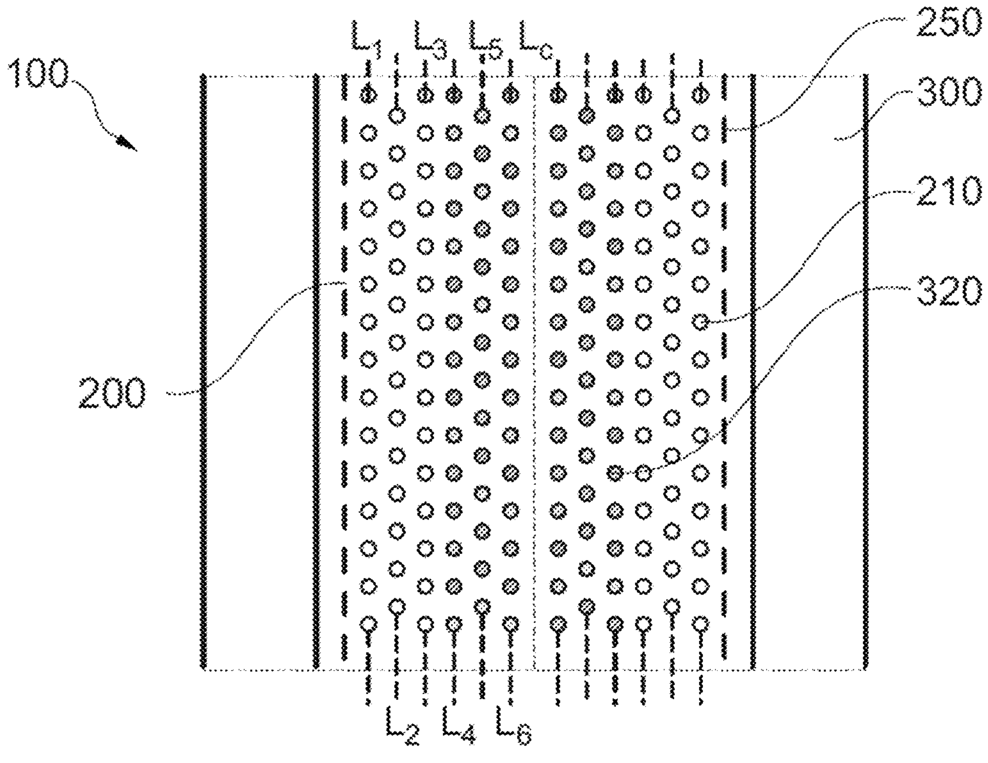
FIG. 5 schematically illustrates a top view of a further example of a plastic laminate according to the present disclosure arranged over a tunnel frame.

In particular, FIG. 5 shows a top view of a region of a plastic laminate comprising twelve different rows of holes.

In the example of FIG. 5, six longitudinal rows $L_1$, $L_2$ $L_3$, $L_4$ $L_5$, $L_6$ are located on a first side of the central longitudinal axis $L_c$ and six other longitudinal rows of holes are located on a second side opposite to the first side of the central longitudinal axis $L_c$. In this example, the holes located at the first and second side are substantially symmetric with respect to the central longitudinal axis $L_c$. A plurality of joints 250 are arranged along the longitudinal direction of the plastic laminate joining the upper and bottom films e.g. via thermo welding and/or adhesives.

In this example, at a first side of the central longitudinal axis $L_c$, the upper film 200 of the plastic laminate comprises a plurality of upper film holes 210 arranged along three different consecutive longitudinal rows $L_1$, $L_2$, $L_3$ and the bottom film 300 of the plastic laminate comprises bottom film holes 320 arranged along other three different consecutive longitudinal rows $L_4$, $L_5$, $L_6$. The longitudinal rows of bottom film holes are arranged closer to the central longitudinal axis $L_c$ of the plastic laminate than the longitudinal rows of the upper film holes.

The upper holes arranged in the middle longitudinal row $L_2$ of the bottom film 300 and the bottom holes arranged in the middle longitudinal row $L_5$ of the upper film 200 are offset with respect to the neighbouring holes. In addition, the holes arranged along the upper and bottom longitudinal rows $L_1$, $L_3$ $L_4$, $L_6$ neighbouring the middle longitudinal rows $L_2$, $L_5$ comprise substantially the same transverse position.

As mentioned before with respect to other examples, the disposition of individual rows offset with respect to each other, and their symmetry or asymmetry may be different in other examples.

Due to their position with respect to the longitudinal axis, and due to the common shape of tunnel frames, when the plastic laminate is arranged over a tunnel frame, the bottom film holes will be higher than the upper film holes, preventing undesired external elements, such as rainwater, to pass to the inside of the greenhouse.

Particularly in the case of multiple rows of holes on either side of the central longitudinal axis, the size of the holes may be smaller than in the case of a single longitudinal row on either side of the central longitudinal axis. E.g. the width may be 10 cm or less, specifically 8 cm or less or 5 cm or less. In the case of round holes, the diameter may be 10 cm or less, specifically 8 cm or less or 5 cm or less.

Figure 6:
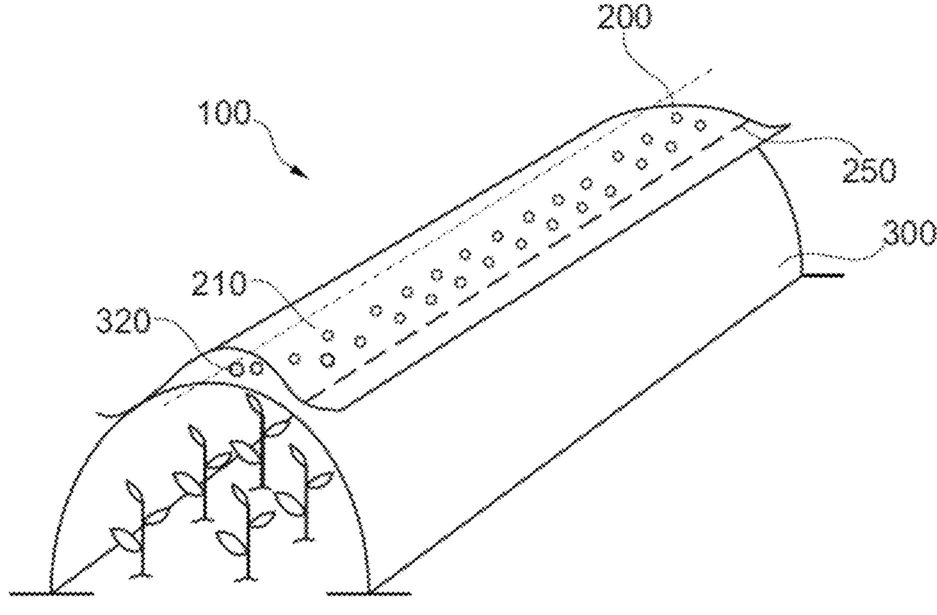
FIG. 6 schematically illustrates a perspective view of a greenhouse comprising a tunnel frame and a plastic laminate according to a further example of the present disclosure.

FIG. 6 schematically illustrates a perspective view of a greenhouse comprising a tunnel frame and a plastic laminate 100 according to a further example of the present disclosure. The upper film 200 and the bottom film 300 of the plastic laminate of FIG. 6 have been drawn vertically separated from one another such that the holes arranged on the bottom film, otherwise covered by the top film in the plastic laminate, are visible.

In this example, the upper film 200 comprises a plurality of upper film holes arranged along two longitudinal rows and the bottom film 300 comprises a plurality of bottom film holes arranged along other two longitudinal rows. The holes of the bottom film and the holes of the upper film are offset with respect to the neighbouring holes.

Figure 7:
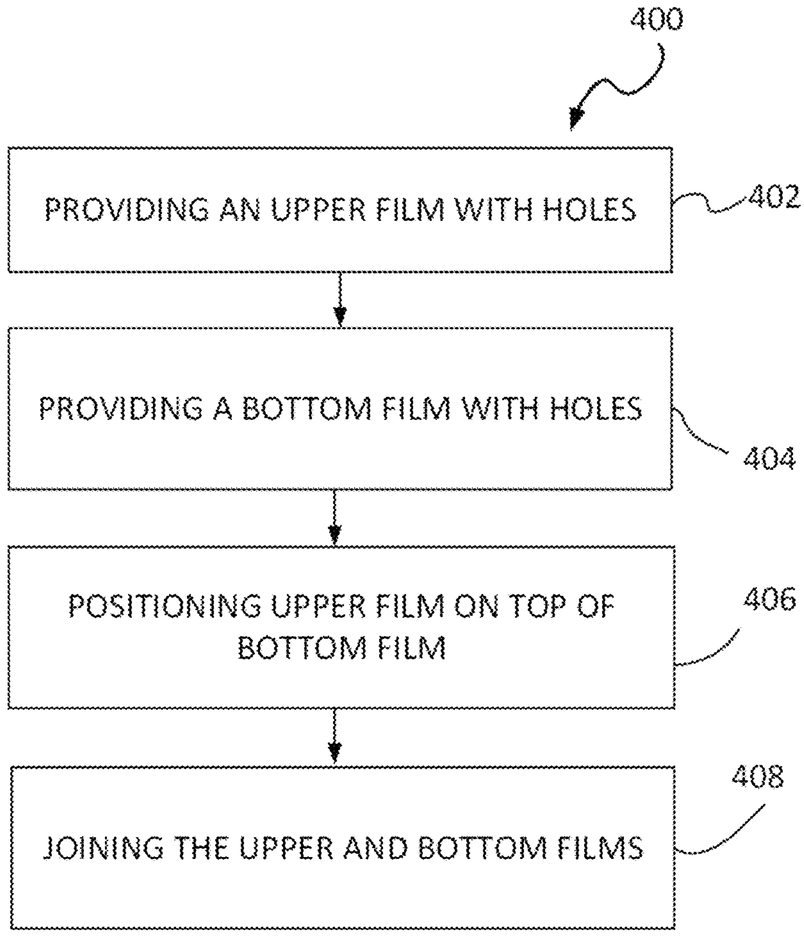
FIG. 7 is a flow chart of an example of a method for manufacturing a plastic laminate for covering agricultural crops.

In another aspect of the present disclosure, a method 400 for manufacturing a plastic laminate for covering agricultural crops is provided. FIG. 7 shows a flowchart of an example of such a method.

The method comprises, at block 402, providing an upper plastic film comprising a plurality of upper film holes. The method further comprises, at block 404, providing a bottom plastic film comprising a plurality of bottom film holes. The films may first be manufactured separately, and perforations may be made in the films as appropriate.

In some examples, the material of the upper plastic film 200 may be different from the material of the bottom plastic film 300. In other examples, the materials may be the same.

The method comprises, at block 406, positioning the upper film on top of the bottom film such that in sue, the bottom film holes will be arranged higher than the neighbouring upper film holes.

In some examples, positioning the films may comprise positioning the first plurality of holes 210 and the second plurality of holes 320 at a distance of at least 10 cm.

Finally, the two films may be joined to each other at block 408. Joining the top and bottom plastic films 200, 300 may comprise forming a first and second plurality of joints along opposite ends of the upper film. The plurality of joints may enclose the plurality of holes within the area defined between them. The joints may be intermittent as hereinbefore described.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A plastic laminate configured for being arranged over a tunnel frame to cover agricultural crops, the tunnel frame having a top area extending along a longitudinal direction, and the plastic laminate comprising:

an upper film comprising upper film holes; and a bottom film comprising bottom film holes, the upper film being attached to the bottom film, the plastic laminate having a central longitudinal axis configured to be arranged along the top area of the tunnel frame, the upper film holes being arranged on first and second sides of the central longitudinal axis, and the bottom film holes also being arranged on the first and second sides of the central longitudinal axis, and the upper film holes and bottom film holes being arranged such that when the plastic laminate is arranged over the tunnel frame, the bottom film holes are located at a vertically higher position than their respective neighbouring upper film holes.

2. The plastic laminate of claim 1, wherein the upper film holes and bottom film holes are arranged symmetrically with respect to the central longitudinal axis.

3. The plastic laminate of claim 1, wherein the upper film holes at the first side of the central longitudinal axis are arranged along a first longitudinal row, and the bottom film holes at the first side of the central longitudinal axis are arranged along a second longitudinal row, and wherein when the plastic laminate is arranged over the tunnel frame, the second longitudinal row is arranged higher than the first longitudinal row.

4. The plastic laminate of claim 1, wherein the upper film holes comprise a plurality of longitudinal rows on the first and second sides of the central longitudinal axis of the laminate, and the bottom film holes comprise a plurality of longitudinal rows on both the first and second sides of the central longitudinal axis; and wherein the plurality of longitudinal rows of the bottom film holes in use are arranged at a vertically higher position than the plurality of longitudinal rows of the upper film holes.

5. The plastic laminate of claim 1, further comprising a plurality of joints arranged in a longitudinal direction of the plastic laminate joining the upper film to the bottom film.

6. The plastic laminate of claim 1, wherein a width of the upper film is different than a width of the bottom film.

7. The plastic laminate of claim 6, wherein the width of the upper film is less than the width of the bottom film.

8. The plastic laminate of claim 1, wherein one or both of the upper film and the bottom film comprises polyolefins.

9. The plastic laminate of claim 1, wherein the upper film is made of a first plastic material and the bottom film is made of a second plastic material different from the first plastic material.

10. The plastic laminate of claim 1, wherein the bottom film holes and upper film holes each have a width of 10 cm or less.

11. A greenhouse comprising a tunnel frame having a top area extending along a longitudinal direction, and a plastic laminate configured for being arranged over the tunnel frame to cover agricultural crops, and wherein the plastic laminate comprises:

an upper film comprising upper film holes; and a bottom film comprising bottom film holes, the upper film being attached to the bottom film, a central longitudinal axis configured to be arranged along the top area of the tunnel frame, wherein the upper film holes are arranged on first and second sides of the central longitudinal axis, and the bottom film holes are also arranged on the first and second sides of the central longitudinal axis, and wherein the upper film holes and the bottom film holes are arranged such that the bottom film holes are located at a vertically higher position than their respective neighbouring upper film holes.

12. A method for manufacturing a plastic laminate for being arranged over a tunnel frame to cover agricultural crops, the method comprising:

providing an upper plastic film comprising upper film holes;

providing a bottom plastic film comprising bottom film holes;

joining the upper and bottom plastic films to form the plastic laminate, wherein the plastic laminate has a central longitudinal axis, and wherein the upper and bottom plastic films are joined such that the bottom film holes are closer to the central longitudinal axis than their respective neighbouring upper film holes, and wherein the upper plastic film comprises one or more longitudinal rows of upper film holes at a first side of the central longitudinal axis and one or more longitudinal rows of upper film holes at a second side of the central longitudinal axis, and wherein the bottom plastic film comprises one or more longitudinal rows of bottom film holes at the first side of the central longitudinal axis and one or more longitudinal rows of bottom film holes at the second side of the central longitudinal axis, and wherein the one or more longitudinal rows of bottom film holes are arranged closer to the central longitudinal axis than the one or more longitudinal rows of upper film holes respectively.

13. The greenhouse of claim 11, wherein the upper film holes are arranged in a first plurality of longitudinal rows on each of the first and second sides of the central longitudinal axis of the plastic laminate, and the bottom film holes are arranged in a second plurality of longitudinal rows on both the first and second sides of the central longitudinal axis; and wherein the second plurality of rows are located in a vertically higher position than the first plurality of rows.

14. The greenhouse of claim 11, wherein a width of the upper film is less than a width of the bottom film.

15. The greenhouse of claim 11, wherein one or both of the upper film and the bottom film comprises polyolefins.

16. The greenhouse of claim 11, wherein each of the upper film holes and bottom film holes has a width of 10 cm or less.

* * * * *